United States Patent
Ifft

(10) Patent No.: US 9,285,288 B2
(45) Date of Patent: Mar. 15, 2016

(54) RETRACTABLE FLOW CONDITIONER

(71) Applicant: Dieterich Standard, Inc., Boulder, CO (US)

(72) Inventor: Stephen Arthur Ifft, Longmont, CO (US)

(73) Assignee: Dieterich Standard, Inc., Boulder, CO (US)

( * ) Notice: Subject to any disclaimer, the term of this patent is extended or adjusted under 35 U.S.C. 154(b) by 128 days.

(21) Appl. No.: 14/037,893

(22) Filed: Sep. 26, 2013

(65) Prior Publication Data

US 2015/0082895 A1 Mar. 26, 2015

(51) Int. Cl.
| | |
|---|---|
| G01F 15/07 | (2006.01) |
| G01L 19/14 | (2006.01) |
| F15D 1/00 | (2006.01) |
| G01F 15/00 | (2006.01) |
| G01F 1/46 | (2006.01) |

(52) U.S. Cl.
CPC .............. G01L 19/147 (2013.01); F15D 1/005 (2013.01); G01F 15/00 (2013.01); G01F 1/46 (2013.01)

(58) Field of Classification Search
None
See application file for complete search history.

(56) References Cited

U.S. PATENT DOCUMENTS

| | | | |
|---|---|---|---|
| 2,929,248 A | 11/1957 | Sprenkle | |
| 4,154,100 A | 5/1979 | Harbaugh et al. | |
| 4,559,836 A | 12/1985 | Coleman et al. | |
| 4,633,713 A | 1/1987 | Mesnard et al. | |
| 5,710,370 A | 1/1998 | Shanahan et al. | |
| 6,142,014 A | 11/2000 | Rilling | |
| 7,281,436 B1 | 10/2007 | Orleskie | |
| 7,654,154 B2 | 2/2010 | Garnett et al. | |
| 7,845,688 B2* | 12/2010 | Gallagher et al. | 285/412 |
| 7,886,624 B1* | 2/2011 | Mayeaux | 73/866.5 |
| 7,934,413 B2* | 5/2011 | Winchester | 73/1.21 |
| 2004/0173030 A1* | 9/2004 | Harman | 73/861.65 |
| 2009/0211369 A1* | 8/2009 | Unalmis et al. | 73/861.61 |
| 2011/0048564 A1* | 3/2011 | Wible et al. | 138/37 |
| 2012/0096948 A1 | 4/2012 | Laird et al. | |

FOREIGN PATENT DOCUMENTS

EP 0 193 290 4/1986

OTHER PUBLICATIONS

Notification of Transmittal of the International Search Report and the Written Opinion of the International Searching Authority from PCT/US2014/049718, dated Oct. 15, 2014.

* cited by examiner

*Primary Examiner* — Andre Allen
(74) *Attorney, Agent, or Firm* — Westman, Champlin & Koehler, P.A.

(57) ABSTRACT

A retractable flow conditioner that includes a body adapted for insertion into a fluid in a confined conduit upstream of a differential pressure measuring probe. The body has at least one flow conditioning element. The retractable flow conditioner also includes a mounting assembly attached to the body. The mounting assembly is configured to retractably mount the body into the confined conduit.

20 Claims, 8 Drawing Sheets

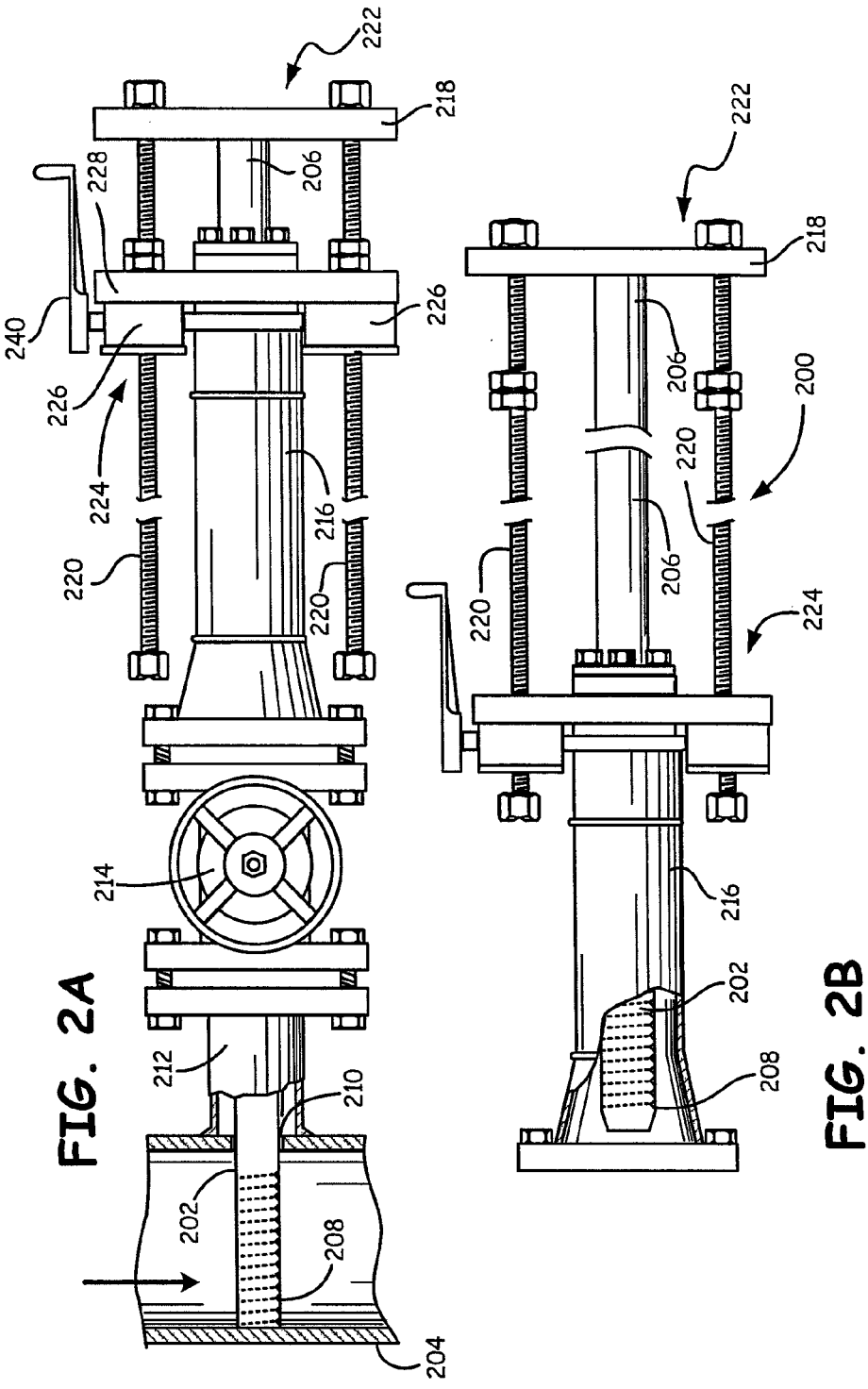

RETRACTABLE FLOW CONDITIONER

BACKGROUND

The present embodiments relate to industrial processes. More specifically, the present embodiments relate to industrial process field devices for use in monitoring or control of industrial processes.

Field devices, such as process variable transmitters, used in industrial processes can be installed in the field on pipelines, tanks and other industrial process equipment. These devices sense process variables such as process fluid flow, process fluid temperature, process fluid pressure, process fluid conductivity, process fluid pH and other process variables. Other types of industrial process field devices include valves, actuators, field controllers, data displays and communication equipment such as industrial field network bridges.

One type of process variable sensor is a flow meter that can measure a rate of fluid flow, for example. One type of flow meter, which employs an averaging pitot tube, is a popular device for flow measurement because of its ability to be inserted into and retracted from a flow line, its low pressure loss, relatively low cost and reliable performance. However, measurement inaccuracies can occur in such flow meters when there are disturbances in flow conditions. The disturbances in flow conditions can be caused by, for example, pipe elbows, reducers, expanders, valves or similar irregularities. Typically, flow disturbances can be conditioned by relatively long runs of straight pipe (for example, up to 30 diameters of straight pipe) upstream of the flow meter such that the flow meter can deliver substantially accurate results.

In some applications where only minimal straight pipe length is available upstream of a flow meter installation, permanent flow conditioners having elements that reduce flow turbulence may be used to improve accuracy of flow meter measurements. However, a permanent flow conditioner is a permanent obstruction in the pipe, which can complicate pipe maintenance operations such as cleaning. Further, permanent flow conditioners can cause pressure loss to the piping system.

SUMMARY

In one example embodiment, a retractable flow conditioner is provided. The retractable flow conditioner includes a body adapted for insertion into a fluid in a confined conduit upstream of a differential pressure measuring probe. The body has at least one flow conditioning element. The retractable flow conditioner also includes a mounting assembly attached to the body. The mounting assembly is configured to retractably mount the body into the confined conduit.

In another example embodiment, a differential pressure fluid flow measuring system for measuring a rate of fluid flow through a fluid carrying conduit is provided. The system includes a differential pressure measuring probe having a lateral width. The system also includes a retractable flow conditioner. The retractable flow conditioner includes an elongate body adapted for retractable insertion into the conduit. The elongate body is disposed upstream of and parallel to the differential pressure measuring probe. The elongate body has a lateral width greater than the lateral width of the differential pressure measuring probe. The retractable flow conditioner also includes openings formed within the elongate body that permit fluid carried by the conduit to flow through the elongate body to the differential pressure measuring probe.

In yet another example embodiment, a flow conditioner for retractable insertion within a fluid-carrying conduit to condition a flow of the fluid within the conduit upstream of a differential pressure measuring probe is provided. The flow conditioner includes an elongate body adapted for retractable insertion into the conduit. The flow conditioner also includes openings within the elongate body that permit fluid carried by the conduit to flow through the elongate body.

BRIEF DESCRIPTION OF THE DRAWINGS

FIGS. 2A through 2C are diagrammatic illustrations of a retractable flow conditioner mount in accordance with one embodiment.

DETAILED DESCRIPTION OF ILLUSTRATIVE EMBODIMENTS

In embodiments described below, industrial process field devices/systems that include retractable flow conditioners that address disturbed flow conditions are provided.

Figure 1A:
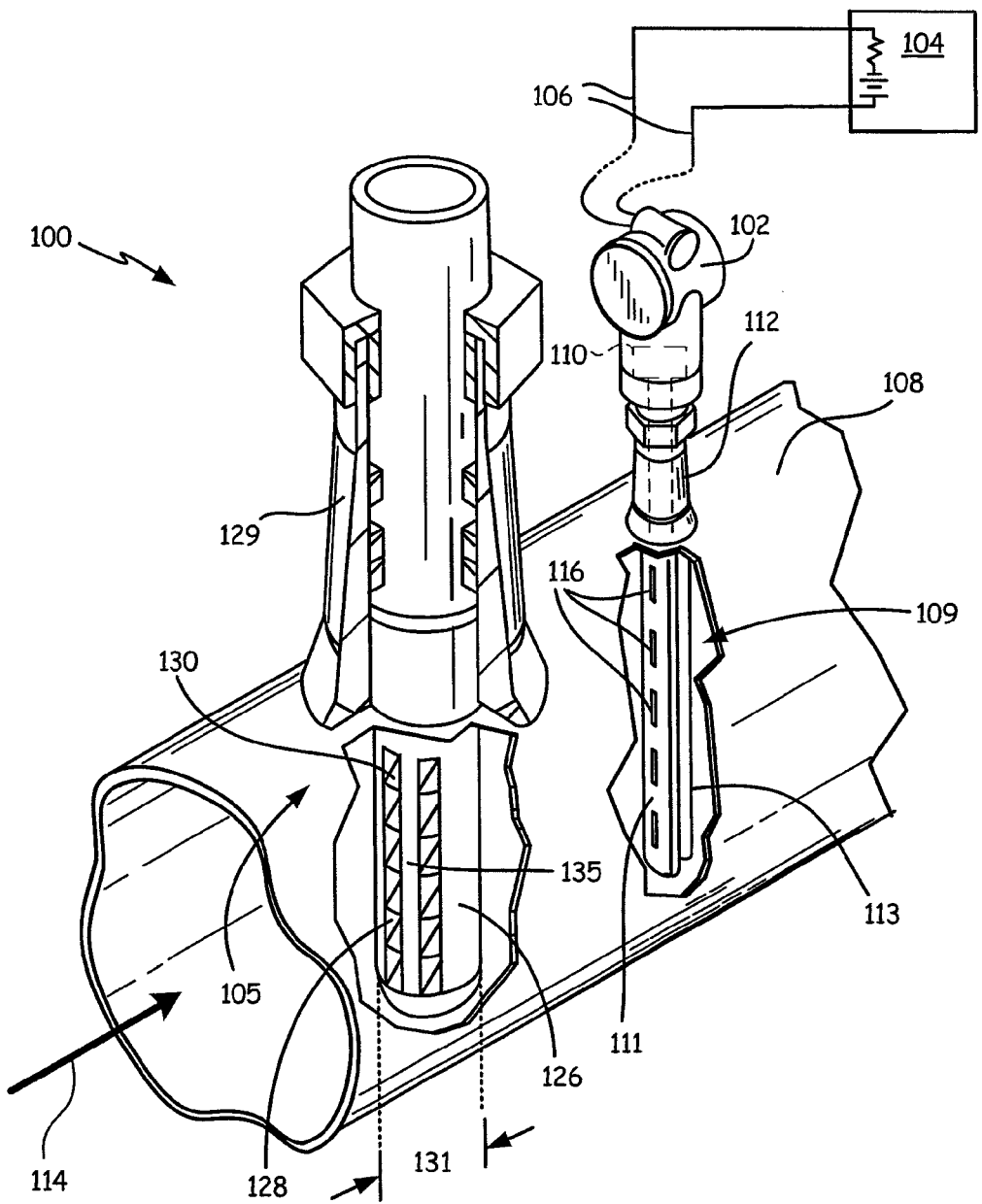
FIG. 1A is an diagrammatic illustration of an industrial process control or monitoring system for use in monitoring or controlling a process fluid in accordance with one embodiment.

FIG. 1A is a simplified diagram showing an industrial process control or monitoring system 100 for use in monitoring or controlling a process fluid in an industrial process. Typically, field devices such as a process variable transmitter 102 are located throughout a processing plant or facility, and transmit a sensed process variable back to a centrally-located control room 104. Various techniques can be used for transmitting the process variable, including both wired and wireless communications. One common wired communication technique uses what is known as a two-wire process control loop 106 in which a single pair of wires is used to both carry information as well as provide power to the transmitter 102. One technique for transmitting information is by controlling the current level through the process control loop 106 between 4 mA and 20 mA. The value of the current within the 4-20 mA range can be mapped to corresponding values of the process variable. Example digital communication protocols include HART® (a hybrid physical layer consisting of digital communication signals superimposed on a standard 4-20 mA analog signal), FOUNDATION™ Fieldbus (an all-digital communication protocol promulgated by the Instrument Society of America in 1992), Profibus communication protocol, or others. Wireless process control loop protocols, such as radio-frequency communication techniques including WirelessHART®, may also be implemented.

Process variable transmitter 102 is connected, via a mounting element 112, to a probe 109 which extends into process piping 108 and is configured to measure a process variable of a process fluid in the process piping 108. Example process variables include flow, temperature, pressure, level, pH, conductivity, turbidity, density, concentration, chemical composition, etc. Process variable transmitter 102 includes a sensor 210 and other components/circuitry (not shown in FIG. 1A) that are configured to receive a process variable from probe 109 and provide a transmitter output on process control loop 106.

In one embodiment, device 102 is a differential pressure transmitter and probe 109 is an averaging pitot tube. Components of differential pressure transmitter 102 and averaging pitot tube 109 are described below in connection with FIG. 1B.

Figure 1B:
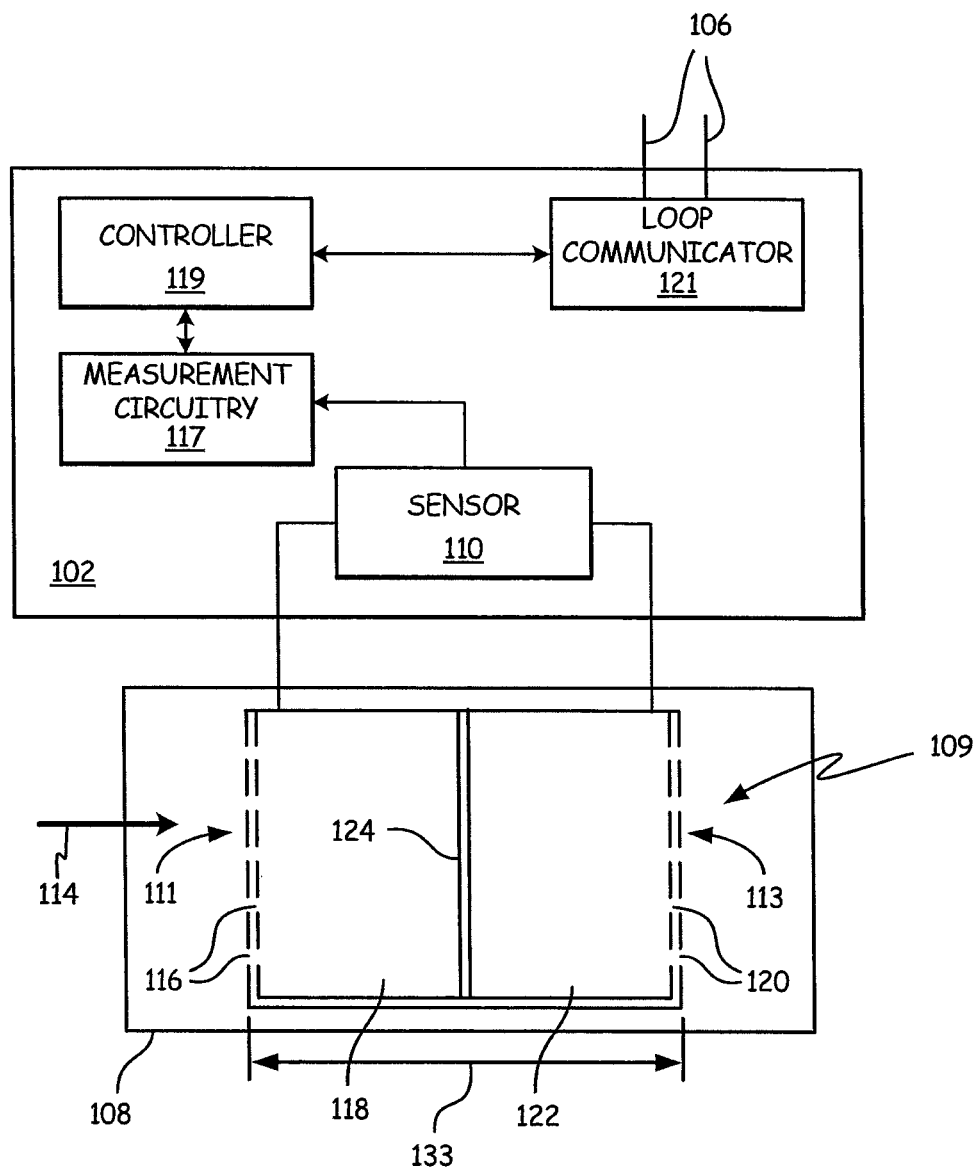
FIG. 1B is a simplified block diagram showing components of the process control or monitoring system of FIG. 1A.

As can be seen in FIGS. 1A and 1B, averaging pitot tube 109 has an upstream facing side 111 and a downstream facing side 113 with respect to a fluid flow direction 114. Upstream facing side 111 includes upstream ports 116 that open into an upstream plenum 118. Similarly, downstream facing side 113 includes downstream ports 120 that open into a downstream plenum 122. Upstream plenum 118 is separated from downstream plenum 122 by any suitable type of barrier 124.

The upstream facing side 111 of the averaging pitot tube 109 senses an average sensor impact pressure of flowing fluid to establish a high pressure value. The downstream facing side 113 of the pitot tube 109 senses low pressure. The high and low fluid pressures are conducted from the plenums 118 and 122 of the pitot tube 109 to the pressure sensor 110. The pressure sensor 110 transforms the respective high and low fluid pressures issuing out of the pitot tube 109 into an electrical signal whose character is a function of the differential pressure (DP), that is the difference between the sensed high and low fluid pressures. Pressure sensor 110 may be equipped with a sensing element comprising a diaphragm. As the diaphragm moves in response to the differential pressure, the movement can be measured by a change in an electrical capacitance and correlated with pressure.

As can be seen in FIG. 1B, in addition to pressure sensor 110, pressure transmitter 102 also includes measurement circuitry 117, a controller 119 and a loop communicator 121. Measurement circuitry 117 is coupled to pressure sensor 110 and can be any electronic circuitry that can provide a suitable signal related to differential pressure. In one embodiment, measurement circuitry 117 is configured to provide a digital output of pressures obtained by pressure sensor 110. In this embodiment, measurement circuitry 117 can be an analog-to-digital converter, a capacitance-to-digital converter or any other appropriate circuitry.

Controller 119 is coupled to measurement circuitry 117 and to loop communicator 121. Controller 119 is adapted to provide a process variable output to loop communicator 121. The process variable output is related to the digital output provided by measurement circuitry 117. Controller 119 can be a programmable gate array device, a microprocessor, or any other appropriate device. Loop communicator 121 provides a transmitter output on process control loop 106. Although loop communicator 121, measurement circuitry 117 and controller 119 have been described with respect to individual modules, it is contemplated that they can be combined such as on an Application Specific Integrated Circuit (ASIC). It should be noted that process communication loop 106 can comprise any suitable number of conductors. For example, process communication loop 106 can be a two-, three-, or four-conductor process communication loop. The conductors themselves can be electrical wires, or fiberoptic media. In one embodiment, loop 106 is a wireless communication loop. In such an embodiment, the conductors are omitted and a loop communicator within circuit 122 is adapted for wireless communication. The wireless loop communicator can include a wireless transmitter and receiver. One example wireless protocol is the WirelessHART® communication protocol.

As noted above, measurement inaccuracies can occur in averaging pitot tubes such as 109 when there are disturbances in flow conditions in a fluid-carrying conduit such as 108. The disturbances in flow conditions can be caused by, for example, pipe elbows, reducers, expanders, valves or similar irregularities.

As noted earlier, in some applications, permanent flow conditioners having elements that reduce flow disturbance may be used to improve accuracy of flow meter measurements. However, a permanent flow conditioner is a permanent obstruction in the pipe, which can complicate pipe maintenance operations such as cleaning. Further, permanent flow conditioners can cause pressure loss to the piping system.

As can be seen in FIG. 1A, a retractable flow conditioner 105 is included in system 100 to reduce disturbances in flow conditions in the fluid-carrying conduit 108. The retractable flow conditioner 105 includes an elongate body (for example, a tubular body) 126 having openings 128 separated by a slat 135. A portion of the elongate body 126 is adapted for retractable insertion into the confined conduit 108. The retractable flow conditioner 105 also includes a mounting element 129, which may be similar to the mounting element 112 for averaging pitot tube 109. A section of mounting element 129 is eliminated in order to show a substantially entire part of an outer surface of elongate body 126 in the isometric view shown in FIG. 1A. Mounting element 129 is configured to removably mount a portion of the elongate body 126 into the fluid-carrying conduit 108. Mounting element 129 can include, for example, compression fittings, flange connections, worm gear assemblies and/or hanger assemblies. These mounting assemblies are described further below in connection with FIGS. 2, 3 and 4.

As can be seen in FIG. 1A, the elongate body 126 is disposed upstream of and parallel to the averaging pitot tube 109. The elongate body 126 and the averaging pitot tube 109 are also in-plane in the direction of fluid flow 114 within conduit 108. The elongate body 126 has a lateral width (designated by reference numeral 131 in FIG. 1A) greater than the lateral width (designated by reference numeral 133 in FIG. 1B) of the averaging pitot tube 109.

The openings 128 are formed within the elongate body 126. The openings 128 permit fluid carried by the conduit 108 to flow through the elongate body 126 to the averaging pitot tube 109. In one embodiment, vanes 130 are disposed within the openings 128 of the elongate body 126. The vanes 130 provide flow conditioning, which includes flow straightening and some flow blockage. In one embodiment, approximately 20% of an area of pipe 108 is obstructed by the flow conditioner 105 with vanes 130. Therefore, the vanes 130 reduce swirl disturbances and the blockage reduces flow profile asymmetry, the two most common flow disturbances in industrial flows. In some embodiments, individual ones of vanes 130 are removably attached within the elongate body 126. It should be noted that slat 135 between openings 128 may also serve as a flow blocking element.

Figure 1C:
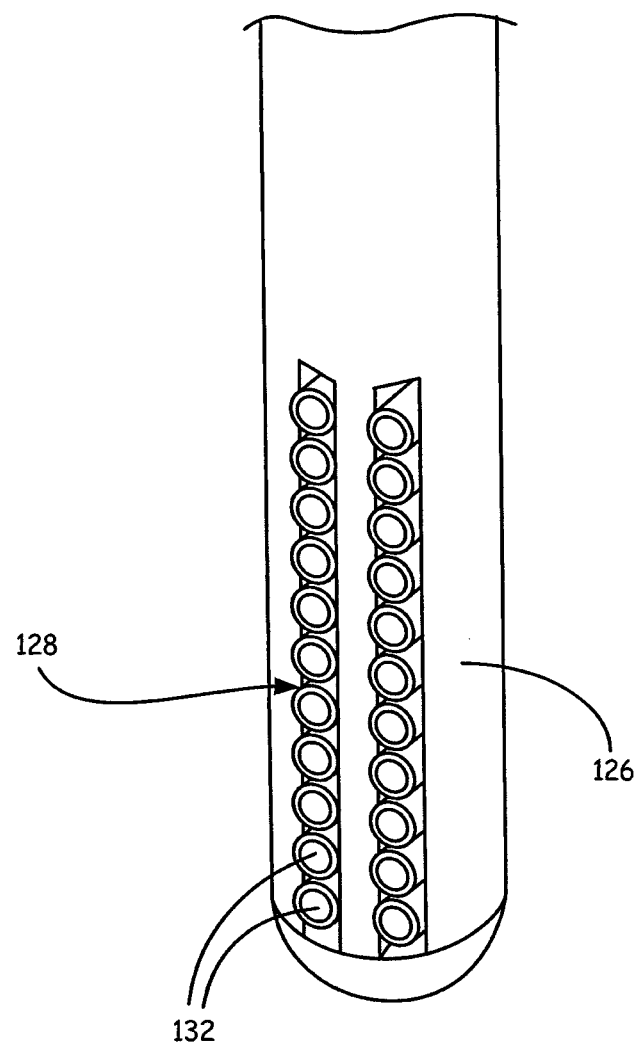
FIG. 1C is a diagrammatic illustration of an alternate embodiment for openings of a retractable flow conditioner of FIG. 1A.

FIG. 1C illustrates an alternate embodiment of the openings 128. In this embodiment, tubes 132 are disposed within the openings 128 of the elongate body 126. The inclusion of tubes 132 instead of vanes 130 provides similar flow conditioning results. Individual ones of tubes 132 may be removably attached within the elongate body 126 and may be easily replaced.

Figures 1D, 1E:
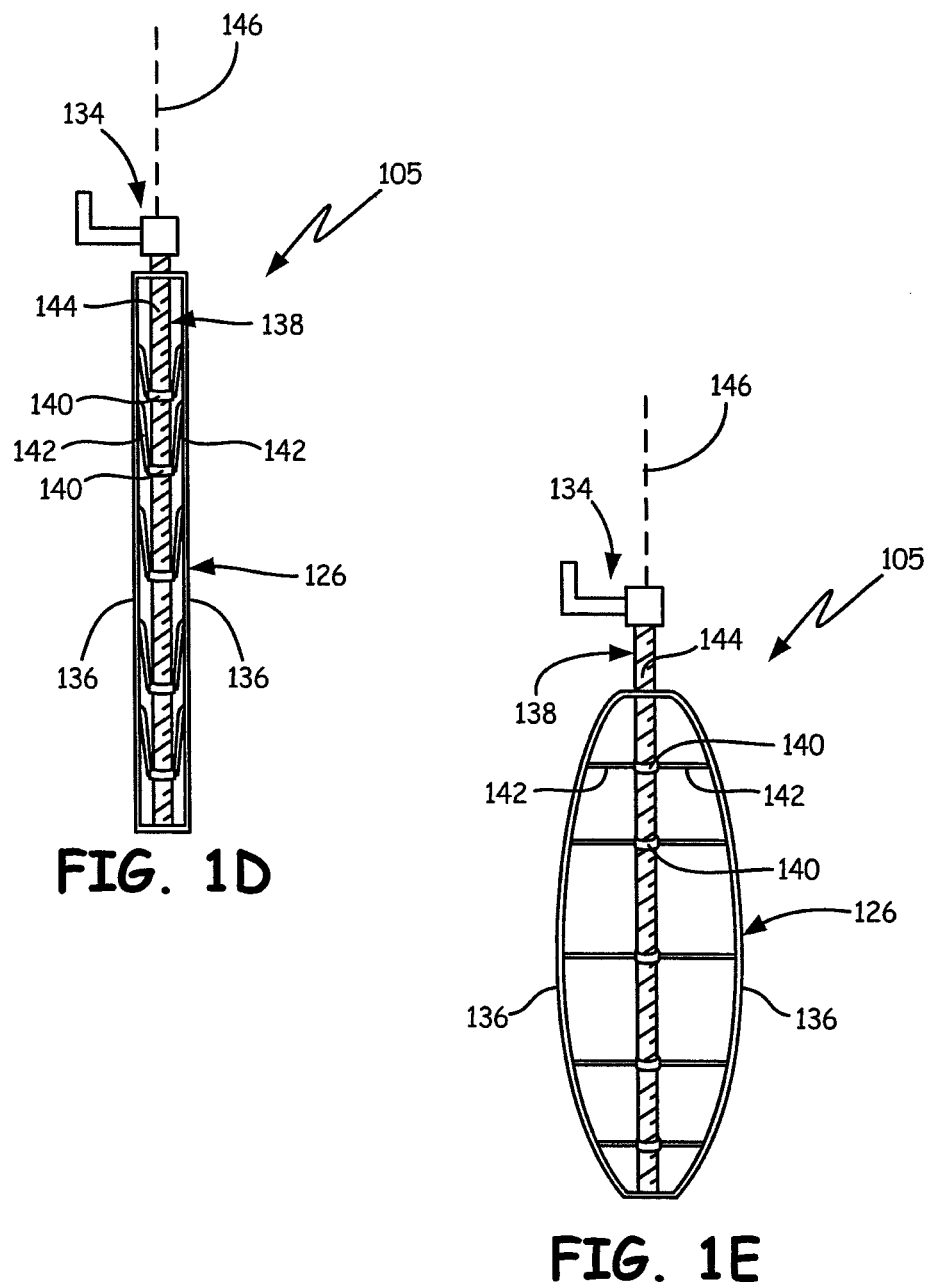
FIGS. 1D and 1E are diagrammatic illustrations of an embodiment of a retractable flow conditioner including expansion means or mechanisms for widening the flow conditioner.

FIGS. 1D and 1E illustrate an embodiment of the flow conditioner 105 including expansion means 134 for widening the flow conditioner 105. In this embodiment, walls 136 of the elongate body 126 are flexible and therefore the elongate body 126 can be inserted through a small opening. Expansion means 134 force the flexible walls 136 outward to widen the elongate body 126 and thereby condition more of the pipe area than without an expandable body.

In one embodiment, the expansion means 136 includes a threaded shaft 138, at least one nut 140, and at least one pair of ribs 142. The shaft 138 includes threads 144 and is disposed within the elongate body 126 on a longitudinal axis 146 of the elongate body 126. The nut 140 has threads (not shown) engaging with the threads 144 of the threaded shaft 138. The pairs of ribs 142 are pivotally attached to the nut 140 and to the flexible walls 136 of the elongate body 126. Rotating the threaded shaft 138 drives the nut 140 along the shaft 138 changing the relative position of the nut 140 to the attachment point of the ribs 142 to the flexible walls 136 to alter the width of the elongate body 126. FIG. 1D illustrates the elongate body 126 in a retracted position. FIG. 1E illustrates the elongate body 126 in an expanded position. In other embodiments, the expansion means includes other mechanisms for expanding an interior or exterior structure of the flow conditioner. For example, the expansion means can include mechanisms for inflating flexible walls 136, mechanisms for expanding a frame supporting flexible walls 136 for example using stent expansion or other techniques or structures, or other expansion mechanisms.

Figure 2C:
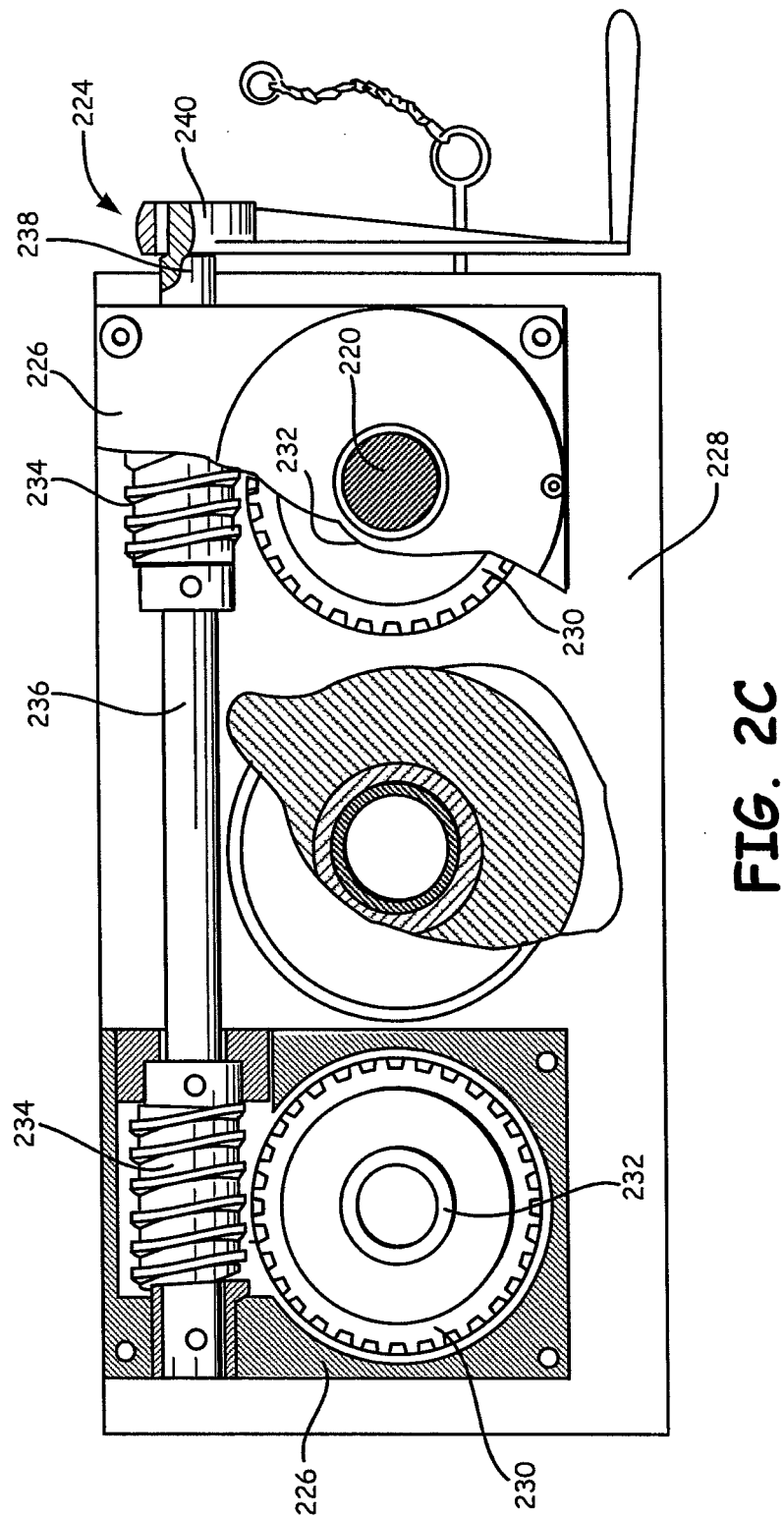

FIGS. 2A through 2C are diagrammatic illustrations that show an assembly 200 for inserting and retracting a flow conditioner 202 into and out of a pipe 204. Flow conditioner 202 has an upper portion 206 which remains outside the confines of the pipe 204 and a flow control portion 208 that extends diametrically across the pipe 204 when in a fully inserted position shown in FIG. 2A. Flow control portion 208 enters the pipe 204 through an opening 210 in its wall. A flanged collar 212 is welded to the pipe 204 in surrounding relation to the opening 210. Bolted to the flange 212 is a shut-off valve 214. A flanged riser tube 216 is bolted to the valve 214 in sealed relation. The upper portion 206 of the flow conditioner 202 is fixedly attached to an underside of a yoke member 218. Non-rotatably suspended from yoke member 218 is a pair of threaded rods 220. Yoke 218 and rods 220 constitute a hanger subassembly 222. A worm gear drive subassembly 224 shown in detail in FIG. 2C is used to lift the flow conditioner 202 free of the pipe 204 and lower the same down into the latter. Worm gear subassembly 224 includes a pair of individual gear housings 226 that are mounted upon a baseplate 228. A worm gear 230 is journalled for rotation in each of the gear housings 226. Hub portions 232 of each such worm gear 230 are internally threaded to mate with the threads on the rods 220. When these worm gears 230 are simultaneously rotated in the same direction about the non-rotatable threaded rods 220, with the help of worms 234 attached to a shaft 236, the hanger subassembly 222 will move up and down. A projecting end 238 of shaft 236 mounts a handcrank 240, the function of which is to actuate the gear train and crank the flow conditioner 202 in and out of the pipe 204.

Figure 3:
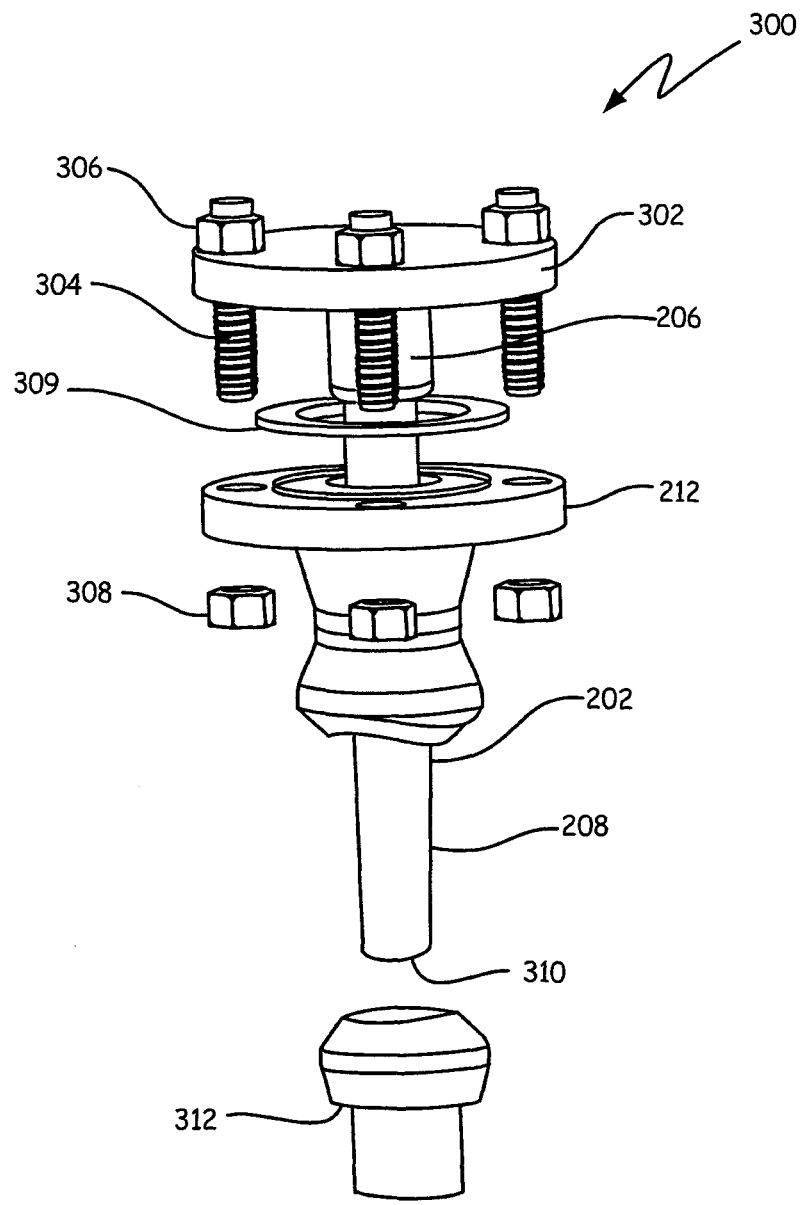
FIG. 3 is a diagrammatic illustration of another embodiment of a retractable flow conditioner mount.

FIG. 3 is an exploded view of another embodiment of an insert/retract mounting assembly 300 for inserting and retracting a flow conditioner into and out of a pipe. Mounting assembly 300 is similar to insert/retract mounting assembly 200 (of FIGS. 2A-2C), but without worm gear drive subassembly 224 (of FIGS. 2A-2C) and shut off valve 214 (of FIG. 2A). Reference numerals used in FIGS. 2A-2C have been repeated in FIG. 3 for elements in FIG. 3 that are similar to those is FIGS. 2A-2C. In the interest of simplification, the pipe (such as 204 of FIG. 2A) is not shown again in FIG. 3. As noted in the description above in connection with FIGS. 2A through 2C, flow conditioner 202 has an upper portion 206 which remains outside the confines of the pipe and an elongate flow control portion 208 that extends diametrically across the pipe when in a fully inserted position. In the interest of simplification, openings and flow control elements included in flow control portion 208 are not shown in FIG. 3. The upper portion 206 of the flow conditioner 202 that remains outside the pipe in both the inserted and retracted positions is fixedly attached to a plate 302. Flow control portion 208 enters the pipe through an opening (similar to 210 of FIG. 2A) in its wall. As in the case of assembly 200 described above, in mounting assembly 300, a flanged collar 212 is welded to the pipe in surrounding relation to the opening. Threaded studs 304 and nuts 306 and 308 are used hold flanged collar 212 and plate 302 together when flow conditioner 202 is in an inserted position. A gasket 309 may be positioned between plate 302 and flange 212. To remove the flow conditioner 202 from the pipe, nuts 308, for example, are removed from studs 304 and the flow control portion 208 of the flow conditioner 202 is withdrawn from the pipe by moving plate 202 away from flange 212. In some embodiments, in the fully inserted position, a bottom end 310 of flow control portion 308 extends out of an opposing hole (not shown) made in the pipe. In such embodiments, an opposing-side support 312 may be, for example, threadably attached to the bottom end 310 of flow control portion 208. In general, any suitable technique may be used to attach opposing-side support 312 to bottom end 310.

Figure 4:
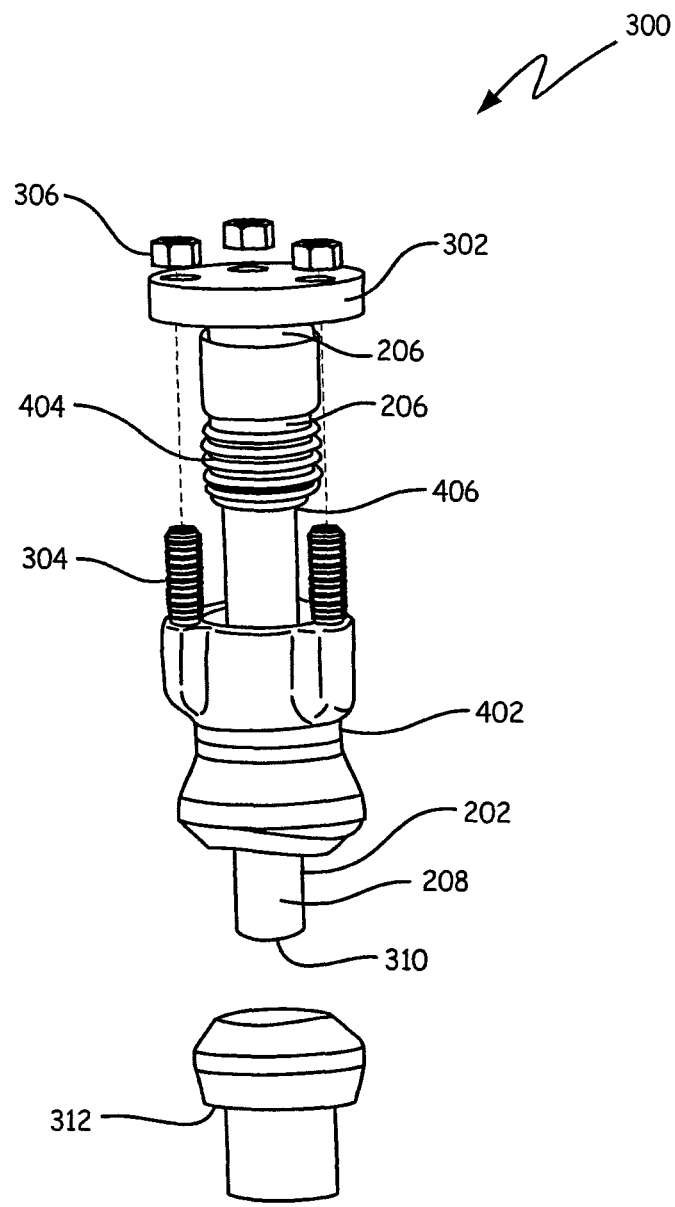
FIG. 4 is a diagrammatic illustration of yet another embodiment of a retractable flow conditioner mount.

FIG. 4 is an exploded view of yet another embodiment of an insert/retract mounting assembly 400 for inserting and retracting a flow conditioner into and out of a pipe (not shown in FIG. 4). The elements of mounting assembly 400 are similar to those of assembly 300 of FIG. 3 and therefore reference numerals used in FIG. 3 are repeated in FIG. 4. As noted above in connection with FIGS. 2A-2C and 3, upper portion 206 of flow conditioner 202 remains outside the confines of the pipe and elongate flow control portion 208 extends diametrically across the pipe when in a fully inserted position. Like mounting flange 212 shown in FIGS. 2A-2C and 3, assembly 400 includes a body 402 that is welded to the pipe in a surrounding relation to an opening (not shown in FIG. 4) in the pipe. Flow control portion 208 of flow conditioner 202 enters the pipe through the opening. As in the case of the assembly 300 of FIG. 3, the upper portion 206 of the flow conditioner 202 remains fixedly attached to plate 302. Compression fittings such as packing rings 404, which may be 3 in number in one embodiment, surround and provide a fluid-tight seal around the upper portion 206 of the flow conditioner 202 when plate 302 is bolted to body 402. Threaded studs 304 and nuts 306 are used hold body 402 and plate 302 together when flow conditioner 202 is in an inserted position. A retaining ring 406 may be used in addition to the packing rings 404. In the embodiment of FIG. 4, the flow conditioner 202 is removed from the pipe in a manner similar to that described above in connection with FIG. 3. As described above in connection with FIG. 3, an opposing-side support 312 may be, for example, threadably attached to a bottom end 310 of flow control portion 208.

In general, the above-described flow conditioners are formed of materials that are capable of withstanding exposure to different types of fluids. In some embodiments, the flow conditioners can comprise stainless and/or carbon steel. However, other materials may also be used.

Although the present invention has been described with reference to preferred embodiments, workers skilled in the art will recognize that changes may be made in form and detail without departing from the spirit and scope of the invention.

What is claimed is:

1. A retractable flow conditioner, comprising:
   a body insertable into a fluid in a confined conduit upstream of a differential pressure measuring probe in the confined conduit, the body having at least one flow conditioning element; and
   a mounting assembly, attached to the body, which retractably mounts the body to the confined conduit, wherein the body including the at least one flow conditioning element are retractable from the confined conduit.

2. The retractable flow conditioner of claim 1, wherein the body is cylindrical in shape.

3. The retractable flow conditioner of claim 1, wherein the at least one flow conditioning element is a plurality of vanes.

4. The retractable flow conditioner of claim 1, wherein the at least one flow conditioning element is a plurality of tubular openings.

5. The retractable flow conditioner of claim 1 and wherein the mounting assembly comprises at least one of compression fittings, flange connections, worm gear assemblies or hanger assemblies.

6. The retractable flow conditioner of claim 1, wherein the body comprises flexible walls and further comprises expansion means for widening the body.

7. The retractable flow conditioner of claim 6, wherein the expansion means includes:
   a threaded shaft having threads and disposed within the body on a longitudinal axis of the body,
   a nut having threads engaging with the threads of the threaded shaft, and
   a plurality of ribs pivotally attached to the nut and the flexible walls of the body.

8. The retractable flow conditioner of claim 1 and wherein the at least one flow conditioning element comprises a flow straightening element and a flow blocking element.

9. A differential pressure fluid flow measuring system for measuring a rate of fluid flow through a fluid carrying conduit, the system comprising:
   a differential pressure measuring probe positioned in the conduit having a lateral width;
   a retractable flow conditioner comprising:
      an elongate body, a portion of which is retractably insertable into the conduit, the elongate body disposed upstream of and parallel to the differential pressure measuring probe, the elongate body having a lateral width greater than the lateral width of the differential pressure measuring probe; and
      openings formed within the elongate body permitting fluid carried by the conduit to flow through the elongate body to the differential pressure measuring probe.

10. The differential pressure fluid flow measuring system of claim 9, further comprising a plurality of vanes within the openings formed in the elongate body.

11. The differential pressure fluid flow measuring system of claim 9, further comprising a plurality of tubes within the openings formed in the elongate body.

12. The differential pressure fluid flow measuring system of claim 9, wherein the elongate body comprises flexible walls and further comprises expansion means for widening the elongate body.

13. The differential pressure fluid flow measuring system of claim 12, wherein the expansion means includes:
   a threaded shaft having threads and disposed within the elongate body on a longitudinal axis of the elongate body,
   a nut having threads engaging with the threads of the threaded shaft,
   a pair of ribs pivotally attached to the nut and the flexible walls of the elongate body, and
   wherein rotating the threaded shaft drives the nut along the shaft changing the relative position of the nut to the attachment point of the ribs to the flexible walls to alter the width of the elongate body.

14. The differential pressure fluid flow measuring system of claim 9, wherein the differential pressure measuring probe comprises an averaging pitot tube.

15. The differential pressure fluid flow measuring system of claim 9, further comprising a pressure transducer coupled to the averaging pitot tube.

16. A flow conditioner for retractable insertion within a fluid-carrying conduit to condition a flow of the fluid within the conduit upstream of a differential pressure measuring probe positioned in the conduit, the flow conditioner comprising:
   an elongate body retractably insertable into the conduit including a flow conditioning element; and
   openings formed within the elongate body permitting fluid carried by the conduit to flow through the elongate body;
   wherein the body including the flow conditioning element are retractable from the confined conduit.

17. The flow conditioner of claim 16, further comprising a plurality of vanes within the openings formed in the elongate body.

18. The flow conditioner of claim 16, further comprising a plurality of tubes within the openings formed in the elongate body.

19. The flow conditioner of claim 16, wherein the elongate body comprises flexible walls and further comprises expansion means for widening the elongate body.

20. The flow conditioner of claim 19, wherein the expansion means includes:
   a threaded shaft having threads and disposed within the elongate body on a longitudinal axis of the elongate body,
   a nut having threads engaging with the threads of the threaded shaft,
   a pair of ribs pivotally attached to the nut and the flexible walls of the elongate body, and
   wherein rotating the threaded shaft drives the nut along the shaft changing the relative position of the nut to the attachment point of the ribs to the flexible walls to alter a width of the elongate body.

* * * * *